United States Patent [19]

Wright et al.

[11] Patent Number: 4,696,445
[45] Date of Patent: Sep. 29, 1987

[54] COLLECTIVE CONTROL SYSTEM FOR A HELICOPTER

[75] Inventors: Stuart C. Wright, Woodbridge; Lorren Stiles, Jr., Woodbury; Don L. Adams, Fairfield, all of Conn.

[73] Assignee: United Technologies Corporation, Hartford, Conn.

[21] Appl. No.: 909,046

[22] Filed: Sep. 18, 1986

[51] Int. Cl.[4] .............................................. B64C 13/12
[52] U.S. Cl. .................................... 244/229; 244/236; 244/223; 244/234
[58] Field of Search ............... 244/75 R, 220, 221, 244/228, 229, 234, 236, 237, 17.13; 74/479, 480 R, 483 R

[56] References Cited

U.S. PATENT DOCUMENTS

| | | | |
|---|---|---|---|
| 2,163,114 | 6/1939 | Ziegler | 244/229 |
| 2,511,446 | 6/1950 | Scheer | 244/223 |
| 2,553,280 | 5/1951 | Rossire | 244/234 |

Primary Examiner—Joseph F. Peters, Jr.
Assistant Examiner—Rodney Corl
Attorney, Agent, or Firm—Gerald E. Linden

[57] ABSTRACT

Pilot workload is reduced in a helicopter having a force-type, multi-axis sidearm control stick by providing a displacement-type control stick for collective blade pitch control. Either stick may be used by the pilot. When the force-type stick is employed, a trim system causes the displacement-stick to track a collective position command signal which is provided to the blade actuators. Changeover of control to the displacement-type control stick is accomplished either with a switch, or by moving the collective-type control stick. The signals associated with each control stick are alternately faded in and out to assure a smooth transition when collective control is switched over from one to the other.

4 Claims, 1 Drawing Figure

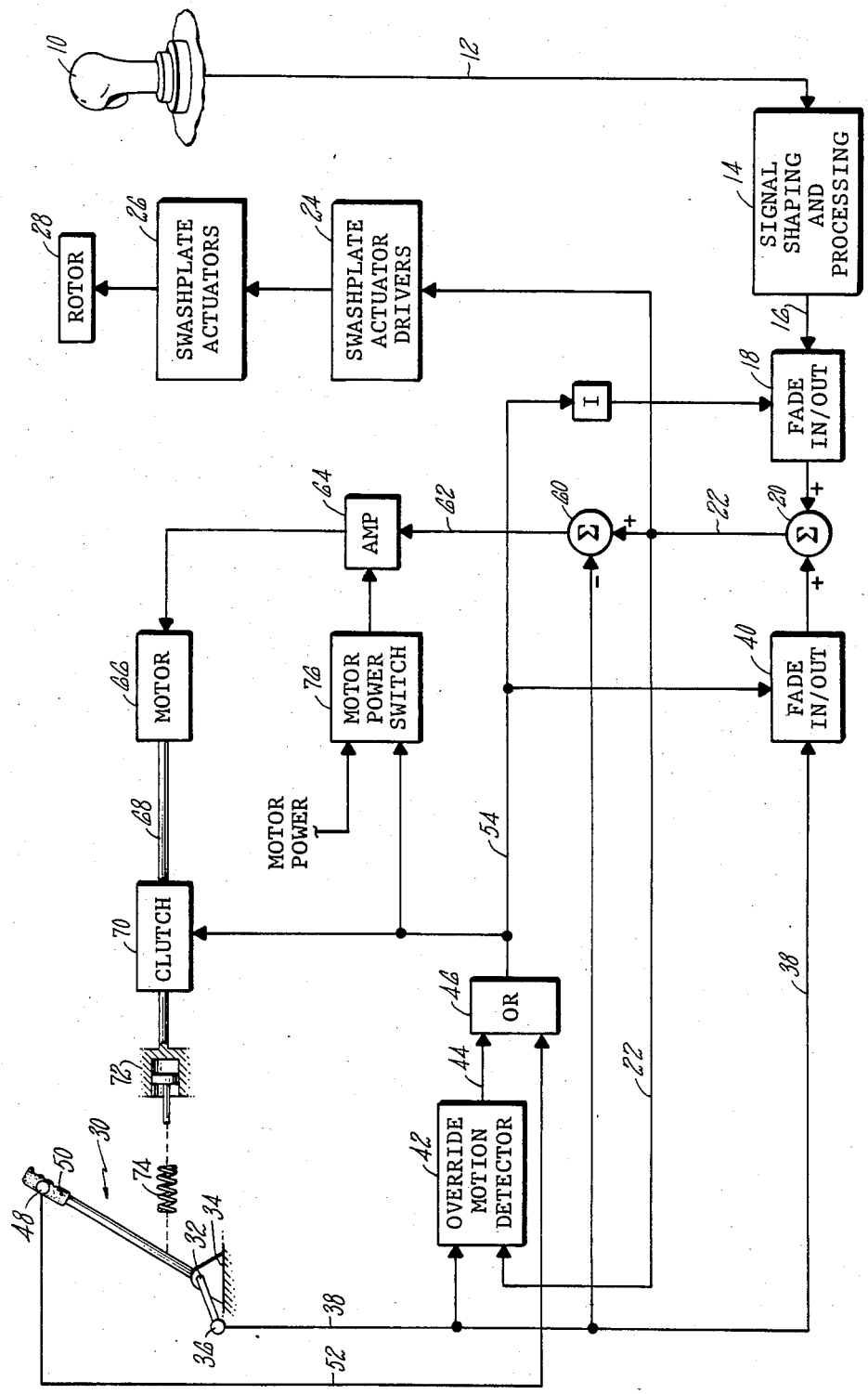

COLLECTIVE CONTROL SYSTEM FOR A HELICOPTER

The Government has rights in this invention pursuant to Contract No. DAAK51-84-C-0007 awarded by the Department of the Army.

TECHNICAL FIELD OF THE INVENTION

The invention relates to helicopter control systems and, more particularly, to those employing a sidearm multi-axis control stick.

BACKGROUND OF THE INVENTION

Traditional helicopter control system employ a cyclic stick for pitch and roll control, pedals for yaw control, and a collective stick for lift control. Commonly-owned U.S. Pat. No. 4,420,808 (Diamond, et al, 1983) discloses a single sidearm controller (control stick) that provides control signals in each of the pitch, roll, yaw, and collective/lift axes of a helicopter control system. The stick is essentially a "force" stick in that there is limited displacement of the stick in each axis. Thus, there is little tactile feedback from the stick to the pilot as to the severity of a maneuver.

Studies have shown that under high vertical workload tasks, such as nap-of-the-earth (NOE) flight operations, the pilot cannot accurately perceive the extent of his collective input without diverting attention to a cockpit display (torque or collective position indicators). Proprioceptive cues are adequate for yaw and cyclic maneuvers, as the aircraft's agility is nearly instantaneous (little energy is required). The aircraft's lift (z-axis) response, however, necessitates a substantial change in energy state and is characterized by a long time constant.

DISCLOSURE OF THE INVENTION

Therefore, it is an object of this invention to provide an improved collective control system for a helicopter that incorporates the sidearm controller.

According to the invention, a four-axis sidearm controller is used in a helicopter to control motion in each of the roll, pitch, yaw, and lift axes. Additionally, the control system is provided with a separate, displacement-type collective control stick. The latter provides the pilot with adequate proprioceptive cues to aid the pilot's judgment when flying NOE missions. The collective commands from the sidearm stick and the displacement stick are faded in and out, respectively, to provide collective control changeover from one to the other. Both are not used simultaneously. Furthermore, when the sidearm stick is active it not only controls the collective pitch of the rotor blades but also provides a signal to a trim actuator (trim follow-up positioning means) that positions the displacement stick (establishes a stick trim position) so as to give the pilot an indication as to the collective pitch of the rotor blades. In other words, the pilot can fly with the sidearm stick while loosely grasping the displacement stick so that he has a tactile cue as to the collective pitch of the blades. In the event that the pilot chooses to use the displacement stick for collective control, he triggers its engagement either by activation of a switch on hand grip of the displacement stick or simply by moving the displacement control stick against its trim position. In either case the trim actuator is disengaged at this point, thus permitting free movement of the displacement stick by the pilot. Disengagement of the switch and/or hands-off operation will cause collective control to be passed back over to the sidearm stick and cause the displacement stick trim actuator to reengage.

Other objects, features and advantages of the invention will become apparent in light of the following description thereof.

BRIEF DESCRIPTION OF THE DRAWINGS

The sole FIGURE herein is a schematic block diagram of the helicopter collective control system of this invention.

BEST MODE FOR CARRYING OUT THE INVENTION

The FIGURE shows a collective control system for a helicopter. A multi-axis sidearm controller 10, such as is disclosed in the aforementioned Diamond patent, provides a signal on a line 12 to a signal shaping and processing circuit 14. The signal on the line 12 is proportional to the vertical force applied by the pilot to the multi-axis control stick 10, and the circuit 14 converts the force-proportional signal on the line 12 to a position-proportional signal on a line 16 that is proportional to the rotor blade collective pitch commanded by the pilot. (Signals in the roll, pitch, and yaw channels of the helicopter that are provided by the multi-axis control stick 10 are not discussed herein.)

The signal on the line 16 is provided to a fade in/out circuit 18, which for the moment will be considered to be fully faded in (i.e., "transparent"), and thence to a summing junction 20. The output of the summing junction 20 is a collective position command signal, on a line 22, which is provided to swashplate actuator drivers 24 which may be electro-hydraulic devices that provide hydraulic control to swashplate actuators 26 in proportion to the collective position command signal, which swashpate actuators 26 ultimately determine the collective pitch of the blades of the helicopter rotor 28. Except for the fade in/out circuit 18 and the summing junction 20, the description so far is simply exemplary of the sidearm controller of the aforementioned Diamond patent.

A displacement-type collective control stick 30 is provided in the collective control system of this invention. In theory, the displacement-type collective control stick 30 is identical to the traditional collective control stick found on many helicopters; in practice, it may be a scaled-down version of that stick which is mounted to the opposite armrest from the multi-axis control stick 30. In any event, the displacement control stick 30 is pivotable about a point 32 with respect to the airframe 34, and an angular position transducer such as a rheostat 36 provides a displacement stick position signal on a line 38 indicative of the position of the displacement-type collective control stick 30. The signal on the line 38 is provided to a fade in/out circuit 40, which for the moment should be considered to be fully faded out (i.e., an open circuit). The signal on the line 38 is also provided to an override motion detector circuit, such as a comparator 42, which is also responsive to the collective position command signal on the line 22 to provide a signal (logic ONE) on a line 44 to an OR gate 46. As will become evident hereinafter, the override motion detector circuit 42 provides the signal on the line 44 when the pilot is moving the displacement collective control stick 30 against its trim position. This would be indicative of the pilot changing over control from the multi-axis control stick 10 to the displacement control stick 30. Alternately, this changeover of control can be indicated by a simple switch closure, such as the closure of a switch 48 disposed on the hand grip 50 of the displacement control stick 30, which provides a signal on a line 52 to the OR gate 46. Hence, there are two ways in which the pilot may initiate a changeover of control from the multi-axis control stick 10 to the displacement control stick 30, either of which techniques results in the OR gate 46 outputting a signal on a line 54. The presence of the signal on the line 54 causes the fade in/out circuit 40 to fade in, and simultaneously is inverted by an inverter 56 to cause the fade in/out circuit 18 to face out. This assures a smooth transition in the changeover of control from the multi-axis control stick 10 to the displacement control stick 30 (i.e., there will be no transients in the collective position command signal on the line 22). Conversely, should the pilot desire to pass command back from the displacement collective stick 30 to the multi-axis control stick 10, the output of the OR gate 46 would go to zero, thus causing the simultaneous fade out of the fade in/out circuit 40 and corresponding fade in of the fade in/out circuit 18.

The collective position command signal on the line 22 and the displacement signal position on the line 38 are provided to a summing junction 60 (with the polarity indicated) so that the output of the summing junction 60 is a collective position error signal on a line 62 indicative of any discrepancy between the current rotor blade (commanded) pitch position (as indicated by the magnitude of the collective position command signal on the line 22) and the actual displacement stick position signal which is continuously provided on the line 38. The collective position error signal on the line 62 is provided to a suitable motor drive circuit, such as an amplifier 64 which powers a linear positioning device, such as a stick trim actuator (motor) 66. The output of the motor 66 is connected via a linkage 68 to a clutch 70, and thence via a damper 72 and a spring 74 to the displacement collective control stick 30. This type of motor/clutch/damper/spring arrangement is typical of a trim system in an automatic flight control system that causes a control stick to "track" a command signal (thus establishing a stick trim position) while allowing the pilot to move the control stick "against trim" by overcoming the spring force. In the context of this invention, when the pilot has initiated collective control via the displacement control stick 30, as discussed hereinbefore, the output of the OR gate 46 is provided on the line 54 to the clutch 70 so that the pilot may manipulate the displacement control stick 30 without resistance from the trim mechanism 66, 70, 72, 74. Simultaneously, the signal on the line 54 is provided to a motor power switch 76 so that power is removed from the amplifier 64 at this time.

We claim:

1. A helicopter collective control system comprising:
a summing junction (20) for providing a collective position command signal to a mechanism for determining the collective pitch of the helicopter main rotor blades;
a multi-axis, force-type control stick (10) operable to provide a first signal indicative of a desired blade collective pitch;
a displacement-type control stick (30) and associated position transducer operable to provide a second signal indicative of a desired blade collective pitch;
first means (18) for alternately fadeing in or out the first signal to the summing junction (20);
second means (40) for alternately fading in or out the second signal to the summing junction (20);
third means for simultaneously causing the first means (18) to fade in and the second means (40) to fade out, and for alternately simultaneously causing the first means (18) to fade out and the second means to fade in.

2. A helicopter collective control system according to claim 1, wherein the third means is a comparator means (42) responsive to the second signal and to the collective position command signal.

3. A helicopter collective control system according to claim 1, wherein the third means is a switch (48).

4. A helicopter collective control sytem according to claim 1, further comprising:
trim means (66,70,72) mechanically connected to the displacement-type control stick (30) for positioning the displacement-type control stick (30) in response to the collective position command signal when the first means (18) is faded in and the second (40) means is faded out (40).

* * * * *